United States Patent Office 2,889,230
Patented June 2, 1959

2,889,230

BITUMINOUS EMULSIONS

John J. Christie, San Lorenzo, Calif., assignor to American Bitumuls & Asphalt Company, San Francisco, Calif., a corporation of Delaware No Drawing. Application July 18, 1957
Serial No. 672,583

5 Claims. (Cl. 106—277)

This invention is directed to the use of aqueous bitumen emulsions stabilized by clays. In particular, this invention pertains to aqueous emulsions of bituminous substances stabilized by clays and having clay deflocculating agents incorporated therein.

Aqueous bituminous emulsions are well known in the art, and they have been used for many purposes over a number of years. In the main, bituminous emulsions are composed particularly of from approximately 40% to 75%, by weight, of a bituminous substance (e.g., asphalt), 0.5 to 5%, by weight, of clay (e.g. bentonite) as the emulsifying agent, and from 25% to 60%, by weight, of water. The amounts of the several components depend upon the various physical characteristics desired of the asphalt composition, such as the resistance to flow at elevated temperatures.

In such emulsions the bituminous material is in the dispersed phase; the water constitutes the continuous phase, and the clay particles coat the bituminous particles to render them dispersed in the water phase. By the use of a third agent, such as that described fully hereinbelow, the clay emulsifying agent is caused to cling more tenaciously to the bituminous substance. For purposes of this invention, this third agent is termed a "deflocculating agent."

In aqueous bituminous emulsions of the present invention, the asphalt particles are for the most part roughly sausage shaped. Because of their consistency and the character of their water-free films, these are particularly well adapted to such uses as coatings over roofing papers, as outdoor protective coatings in general, and as undercoatings for automobile bodies.

Whereas asphalts per se usually become brittle and crack upon weathering, the water-free film asphalts obtained by the use of the composition described herein weather free of cracking and allied deteriorating effects; and the dehydrated clay-bituminous emulsion film is less affected by lower temperatures than the asphalt per se.

After the aqueous bitumen emulsions have been applied to the surface to be covered, the resulting water-free film consists of layers of stacked particles protected by a layer of the silicious material. When the aqueous clay-asphalt emulsions described herein are applied to vertical surfaces such as the sides of storage tanks, for example, the emulsified asphalt does not flow away from the coated surface.

It is a primary object of this invention to provide an aqueous-bituminous substance emulsion, a protective coating of which, after drying, is substantially water proof, and will withstand a relatively high temperature without flowing, is relatively inexpensive, and is substantially permanent in that it may be stored without settling or other change in properties.

In accordance with the invention described herein, it has been discovered that clay-stabilized aqueous bitumen emulsions can be prepared by incorporating therein an agent which deflocculates the clay particles to effectively form a stable aqueous bitumen emulsion.

The emulsions described herein consist broadly of stable dispersions of a bituminous substance in the dispersed, or internal, phase, with a dispersion of clay in water in the continuous, or external, phase, with clay coupled with the deflocculating agent described hereinbelow at the bitumen-water interface.

The particular improved clay-stabilized aqueous bitumen emulsions herein are beneficially used in the preparation of paper stocks which are internally sized by bituminous substances. That is, internal sizing of paper stock by the clay-stabilized bitumen emulsions described herein results in paper stock of greater strength than that obtained by use of bitumen emulsions already known in the art.

The deflocculating agent is an oil-soluble, water-dispersible, alkylphenylpolyoxyalkylene, alkyl amine of the formula

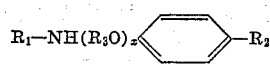

wherein $R_1$ is a hydrocarbon radical, such as an alkyl radical, having from 12 to 20 carbon atoms; $R_2$ is a hydrocarbon radical, such as an alkyl radical, having from 6 to 12 carbon atoms; $R_3$ is ethylene or propylene; and $x$ is a number greater than 1, preferably from 2 to 8. Because of the increased effectiveness in deflocculating the clay in the preparation of the emulsion of this invention, it is preferred that $R_1$ is an alkyl radical having from 16 to 18 carbon atoms; that $R_2$ is an alkyl radical containing from 8 to 10 carbon atoms; that $R_3$ is ethylene; and that $x$ is a number ranging from 2 to about 4.

The bituminous substances which are used herein, and which are present in the aqueous emulsions in amounts of about 40% to about 70%, by weight, can be the steam-refined asphalts, air-blown asphalts, bituminous substances from coal tars, etc. These bituminous materials that may be employed in accordance with this invention are normally solid, semi-solid, or viscous liquids at ordinary atmospheric temperatures. Examples of suitable bituminous substances or bitumens are petroleum or native asphalt, pyrogenous distillates, such as oil-gas tar, coal tar, pyrogenous residues, sludge asphalts, pressure tars, tar pitch, pyrobitumens, etc. Of the foregoing materials, the petroleum asphalts produced by steam refining, by air blowing, by solvent extraction methods, or by a combination of such methods are most advantageously used.

The silicious materials used herein are obtainable from various clays, such as bentonite.

The prepared emulsion can have a water content ranging from 30%, by weight, to 60%, by weight.

The clay is present in the aqueous emulsion in amounts of about 1% to about 5%, by weight, preferably from about 2% to about 4%, by weight.

The deflocculating agents, that is, the alkylphenyl-polyalkoxyalkylene alkyl amine is present in the aqueous emulsion composition in amounts ranging from 0.1% to 1.0%, by weight, preferably from 0.1% to 0.5%, by weight.

In the preparation of the composition of this invention, emulsification of the bituminous substance by the clay can be accomplished by adding a heated bituminous substance to a slurry of clay in water while the whole mixture is being agitated constantly. For the purpose of obtaining a more stable clay emulsion, it is preferred that the deflocculating agent is added to the water after the clay is added. The finished product, that is, the finished water-free surface obtained is more water resistant than water-free surfaces from presently known clay-stabilized bitumen emulsions.

In preparing the aqueous bitumen emulsions of the present invention, a rapid beater mechanism is preferably used to disperse the asphalt particles in the clay-water mixture which contains the deflocculating agent.

The examples set forth hereinbelow illustrate the practice of this invention. In all of the examples, the asphalt was a petroleum asphalt, that is, a Boscan asphalt having a penetration of 85/100 as measured by the ASTM D-5-25 method; the deflocculating agent was an alkylphenylpolyoxyalkylene alkyl amine known as "Katapol PN-430," and sold by the Antara Chemical Company, New York, N.Y., and characterized by the formula:

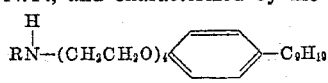

wherein R is derived from tallow.

As used herein, the term "Boscan asphalt" means a steam-refined asphalt obtained from a Venezuelan crude.

In the preparation of this additive, 1 mol of nonylphenol and 4 mols of ethylene oxide are reacted to form:

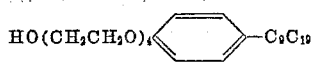

and this glycol is then reacted with 1 mol of tallow amine to form the desired product.

EXAMPLE

From separate lines to the mixer, a Boscan 85/100 asphalt having a viscosity of 255 SSF at 275° F. and maintained at a temperature of about 255° F., and an aqueous dispersion (at room temperature) of 6.5%, by weight, of dry bentonite and 0.5%, by weight, of Katapol PN-430 were pumped into the mixer, each at the rate of 30 gallons per hour. The final emulsion had a residue of about 53%; that is, the resulting emulsion contained about 47% water. The emulsion texture was smooth and the consistency was rated as "good." The water resistance of the resulting coating obtained by the application of the emulsion was rated as "excellent."

Table I hereinbelow sets forth further data illustrating the effectiveness of the alkylphenylpolyoxyalkylene, alkyl amines as deflocculating agents for clay-stabilized asphalt emulsions according to the present invention. Table I also sets forth the conditions under which the aqueous-bitumen emulsions were prepared.

The water resistance test was run as follows:

The clay-stabilized aqueous bitumen emulsions to be tested were applied as thin films on a microscope slide and dried. The slide thus prepared was immersed in distilled water at 110° F. to 130° F. for 24 hours. The slide was removed from the water and graded visually (1) as to film strength, and (2) as to its ability to re-emulsify.

Table I

|  | Test No. | | | | | |
|---|---|---|---|---|---|---|
|  | 1 | 2 | 3 | 4 | 5 | 6 |
| I. Composition, percent by weight: | | | | | | |
| (1) Asphalt | 48.34 | 48.9 | 51.05 | 48.0 | 49.75 | 50.9 |
| (2) Bentonite | 3.31 | 3.3 | 3.3 | 3.3 | 3.3 | 3.3 |
| (3) Alkylphenylpolyoxyalkylene, alkyl amine [1] | 0.15 | 0.2 | 0.25 | 0.3 | 0.35 | 0.4 |
| (4) Water | 48.20 | 47.6 | 45.4 | 48.4 | 46.6 | 45.4 |
| II. Manufacturing Conditions: | | | | | | |
| (1) Asphalt Temp., °F. | 245 | 250 | 250 | 255 | 260 | 250 |
| (2) Water Temp., °F. | 70 | 76 | 76 | 77 | 96 | 88 |
| (3) Emulsion Temp., °F. | 155 | 150 | 155 | 140 | 165 | 165 |
| III. Residue, percent by weight | 51.8 | 52.4 | 54.6 | 51.6 | 53.4 | 54.6 |
| IV. Appearance | Good | Good | Good | Good | Good | Good |
| V. Water Resistance | Good | Good | Good+ | Good+ | Good+ | Good+ |

[1] Katapol PN-430.

In addition to the components noted hereinabove, silicic acid may be added.

I claim:

1. A composition of matter comprising an aqueous dispersion of 0.1% to 1.0% of an alkylphenylpolyoxyalkylene alkyl amine of the formula

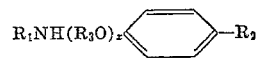

wherein $R_1$ is an alkyl radical containing from 12 to 20 carbon atoms and $R_2$ is an alkyl radical containing from 6 to 12 carbon atoms; $R_3$ is an alkylene radical having from 2 to 3 carbon atoms; and $x$ is a number greater than 1, in a composition comprising about 1% to 5%, by weight, bentonite, from 40% to 70% of a petroleum steam refined asphalt, and from 30% to 60% water.

2. A composition of matter comprising a bentonite-stabilized aqueous petroleum steam-refined asphalt emulsion comprising from 40% to 70%, by weight, of a petroleum asphalt, 2% to 4%, by weight, of bentonite, 30% to 60% water, and 0.1% to 0.5% of an alkylphenylpolyoxyalkylene alkyl amine of the formula

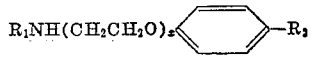

wherein $R_1$ is an alkyl radical containing from 12 to 20 carbon atoms; $R_2$ is an alkyl radical containing from 6 to 12 carbon atoms; and $x$ is a number having a value from 2 to 8.

3. A composition of matter comprising a bentonite-stabilized aqueous petroleum steam-refined asphalt emulsion comprising from 40% to 70%, by weight, of a petroleum asphalt, 2% to 4%, by weight, of bentonite, 30% to 60% water, and 0.1% to 0.5% of an alkylphenylpolyoxyalkylene alkyl amine of the formula

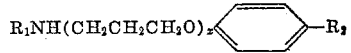

wherein $R_1$ is an alkyl radical containing from 12 to 20 carbon atoms; $R_2$ is an alkyl radical containing from 6 to 12 carbon atoms; and $x$ is a number having a value from 2 to 8.

4. A composition of matter comprising a bentonite-stabilized aqueous petroleum steam-refined asphalt emulsion comprising from 40% to 70%, by weight, of a petroleum asphalt, 2% to 4%, by weight, of bentonite, 30% to 60% water, and 0.1% to 0.5% of an alkylphenylpolyoxyalkylene alkyl amine of the formula

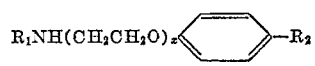

wherein $R_1$ is an alkyl radical containing from 16 to 18 carbon atoms; $R_2$ is an alkyl radical containing from 8 to 10 carbon atoms; and $x$ is a number having a value from 2 to 8.

5. A composition of matter comprising a bentonite-stabilized aqueous petroleum steam refined asphalt emulsion comprising from 40% to 70%, by weight, of a petroleum asphalt, 2% to 4%, by weight, of bentonite, 30% to 60% water, and 0.1% to 0.5% of an alkylphenylpolyoxyalkylene alkyl amine of the formula

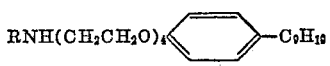

wherein R is derived from tallow.

References Cited in the file of this patent

UNITED STATES PATENTS

| 1,049,916 | Raschig | Jan. 7, 1913 |
| 1,296,083 | Ollemann | Mar. 4, 1919 |
| 2,229,024 | Bruson | Jan. 21, 1941 |

FOREIGN PATENTS

| 528,474 | Canada | July 31, 1956 |